(12) United States Patent
DiMartino et al.

(10) Patent No.: US 8,249,935 B1
(45) Date of Patent: Aug. 21, 2012

(54) METHOD AND SYSTEM FOR BLOCKING CONFIDENTIAL INFORMATION AT A POINT-OF-SALE READER FROM EAVESDROPPING

(75) Inventors: Allison DiMartino, Overland Park, KS (US); Ryan Dreiling, Gardner, KS (US); Elizabeth Roche, Prairie Village, KS (US); Kevin Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 282 days.

(21) Appl. No.: 11/863,229

(22) Filed: Sep. 27, 2007

(51) Int. Cl.
*G06Q 20/00* (2012.01)
(52) U.S. Cl. .......................................... 705/16; 705/17
(58) Field of Classification Search ..................... 705/16
See application file for complete search history.

(56) References Cited

U.S. PATENT DOCUMENTS

| | | | |
|---|---|---|---|
| 5,453,601 A | 9/1995 | Rosen | |
| 5,496,966 A * | 3/1996 | Hightower et al. | 174/353 |
| 6,122,625 A | 9/2000 | Rosen | |
| 6,446,049 B1 | 9/2002 | Janning et al. | |
| 6,584,326 B1 | 6/2003 | Boydston et al. | |
| 6,679,423 B2 | 1/2004 | Ijichi et al. | |
| 6,879,965 B2 | 4/2005 | Fung et al. | |
| 6,880,085 B1 | 4/2005 | Balczewski et al. | |
| 7,146,159 B1 | 12/2006 | Zhu | |
| 7,233,785 B2 | 6/2007 | Yamagishi et al. | |
| 7,269,256 B2 | 9/2007 | Rosen | |
| 7,413,113 B1 | 8/2008 | Zhu | |
| 7,434,723 B1 | 10/2008 | White et al. | |
| 7,475,044 B1 | 1/2009 | Kawai et al. | |
| 7,494,067 B1 | 2/2009 | Zhu | |
| 7,546,956 B2 | 6/2009 | Adams et al. | |
| 7,644,039 B1 | 1/2010 | Magee et al. | |
| 7,644,859 B1 | 1/2010 | Zhu | |
| 7,707,113 B1 | 4/2010 | DiMartino et al. | |
| 7,748,636 B2 | 7/2010 | Finn | |
| 7,819,307 B2 | 10/2010 | Lyons et al. | |
| 7,822,688 B2 | 10/2010 | Labrou et al. | |
| 7,926,714 B1 | 4/2011 | Zhu | |
| 8,055,184 B1 | 11/2011 | DiMartino et al. | |
| 8,060,449 B1 | 11/2011 | Zhu | |
| 8,107,953 B2 | 1/2012 | Zimmerman et al. | |
| 8,123,128 B1 | 2/2012 | Zhu | |
| 8,126,806 B1 | 2/2012 | DiMartino et al. | |
| 8,165,961 B1 | 4/2012 | DiMartino et al. | |
| 2001/0005184 A1 * | 6/2001 | Tsuno et al. | 343/909 |
| 2002/0006806 A1 | 1/2002 | Kinnunen et al. | |
| 2002/0011519 A1 * | 1/2002 | Shults, III | 235/462.01 |
| 2002/0052754 A1 | 5/2002 | Joyce et al. | |
| 2002/0062284 A1 | 5/2002 | Kawan | |
| 2002/0123971 A1 | 9/2002 | Maritzen et al. | |

(Continued)

OTHER PUBLICATIONS

Office Action dated Mar. 6, 2009, U.S. Appl. No. 11/863,632, filed Sep. 28 2007, 8 pages.

(Continued)

*Primary Examiner* — Ig T An

(57) ABSTRACT

A method for point-of-sale transactions is disclosed. The method comprises a point-of-sale terminal receiving a confidential information from a portable electronic device over a contactless communication link, the confidential information being used by the point-of-sale terminal to complete the transaction. The method also includes substantially blocking access to the contactless communication link beyond the area adjacent to the point-of-sale terminal to reduce eavesdropping on the confidential information.

20 Claims, 9 Drawing Sheets

U.S. PATENT DOCUMENTS

| | | | |
|---|---|---|---|
| 2002/0147913 | A1 | 10/2002 | Lun Yip |
| 2003/0009382 | A1* | 1/2003 | D'Arbeloff et al. ............ 705/17 |
| 2003/0028481 | A1 | 2/2003 | Flitcroft et al. |
| 2003/0032409 | A1 | 2/2003 | Hutcheson et al. |
| 2003/0045328 | A1 | 3/2003 | Natsuno |
| 2003/0070080 | A1 | 4/2003 | Rosen |
| 2003/0083933 | A1 | 5/2003 | McAlear |
| 2003/0149900 | A1 | 8/2003 | Glassman et al. |
| 2003/0211862 | A1 | 11/2003 | Hutchison, IV et al. |
| 2004/0093265 | A1* | 5/2004 | Ramchandani et al. ........ 705/14 |
| 2004/0122771 | A1 | 6/2004 | Celi, Jr. et al. |
| 2004/0166839 | A1 | 8/2004 | Okkonen et al. |
| 2004/0192303 | A1 | 9/2004 | Puthenkulam |
| 2004/0203601 | A1 | 10/2004 | Morriss et al. |
| 2005/0216424 | A1 | 9/2005 | Gandre et al. |
| 2005/0234778 | A1* | 10/2005 | Sperduti et al. ................ 705/22 |
| 2006/0073808 | A1 | 4/2006 | Buchert |
| 2006/0085847 | A1 | 4/2006 | Ikeuchi et al. |
| 2006/0136334 | A1 | 6/2006 | Atkinson et al. |
| 2006/0165060 | A1 | 7/2006 | Dua |
| 2006/0167823 | A1 | 7/2006 | York et al. |
| 2006/0191995 | A1* | 8/2006 | Stewart et al. ................ 235/379 |
| 2006/0211408 | A1 | 9/2006 | Yamagishi et al. |
| 2007/0010213 | A1* | 1/2007 | Dewan ......................... 455/101 |
| 2007/0011461 | A1 | 1/2007 | Jeng |
| 2007/0080215 | A1 | 4/2007 | Ramachandran et al. |
| 2007/0095892 | A1 | 5/2007 | Lyons et al. |
| 2007/0125840 | A1 | 6/2007 | Law et al. |
| 2007/0145152 | A1 | 6/2007 | Jogand-Coulomb et al. |
| 2007/0198410 | A1* | 8/2007 | Labgold et al. ................. 705/44 |
| 2007/0223685 | A1 | 9/2007 | Boubion et al. |
| 2007/0233615 | A1 | 10/2007 | Tumminaro |
| 2007/0234427 | A1 | 10/2007 | Gardner et al. |
| 2007/0244811 | A1 | 10/2007 | Tumminaro |
| 2007/0248232 | A1 | 10/2007 | Driscoll et al. |
| 2007/0255620 | A1 | 11/2007 | Tumminaro et al. |
| 2007/0255652 | A1 | 11/2007 | Tumminaro et al. |
| 2007/0281664 | A1 | 12/2007 | Kaneko et al. |
| 2007/0291995 | A1* | 12/2007 | Rivera .......................... 382/115 |
| 2008/0059379 | A1 | 3/2008 | Ramaci et al. |
| 2008/0067240 | A1 | 3/2008 | Nakano et al. |
| 2008/0126260 | A1* | 5/2008 | Cox et al. ......................... 705/67 |
| 2008/0201212 | A1 | 8/2008 | Hammad et al. |
| 2008/0238610 | A1 | 10/2008 | Rosenberg |
| 2008/0297306 | A1 | 12/2008 | Huajun et al. |
| 2008/0315989 | A1 | 12/2008 | Mirkazemi-Moud et al. |
| 2009/0018964 | A1 | 1/2009 | Liu et al. |
| 2009/0046858 | A1 | 2/2009 | Iyer et al. |
| 2009/0050689 | A1 | 2/2009 | Sako et al. |
| 2009/0078761 | A1 | 3/2009 | Sines |
| 2009/0097531 | A1 | 4/2009 | Franceschini et al. |
| 2009/0253409 | A1 | 10/2009 | Slavov et al. |
| 2009/0270174 | A1 | 10/2009 | Kelly et al. |
| 2009/0313689 | A1 | 12/2009 | Nyström et al. |
| 2010/0030651 | A1 | 2/2010 | Matotek et al. |
| 2010/0094752 | A1 | 4/2010 | Heath |
| 2010/0133337 | A1 | 6/2010 | Van Rensburg |
| 2011/0006112 | A1 | 1/2011 | Mueller |
| 2011/0053560 | A1 | 3/2011 | Jain et al. |

OTHER PUBLICATIONS

Office Action dated May 6, 2009, U.S. Appl. No. 11/863,632, filed Sep. 28, 2007, 11 pages.

Office Action dated Jun. 17, 2009, U.S. Appl. No. 11/949,759, filed Dec. 3, 2007, 6 pages.

Office Action dated Nov. 13, 2009, U.S. Appl. No. 11/949,759, filed Dec. 3, 2007, 19 pages.

Notice of Allowance dated Dec. 1, 2009, U.S. Appl. No. 11/863,632, 17 pages.

Office Action dated May 25, 2010, U.S. Appl. No. 11/949,759, filed Dec. 3, 2007, 14 pages.

Final Office Action dated Sep. 10, 2010, U.S. Appl. No. 11/949,759, filed Dec. 3, 2007, 15 pages.

Office Action dated Feb. 15, 2011, U.S. Appl. No. 11/949,759, filed Dec. 3, 2007.

Zhu, Kevin, Patent Application entitled, "Mobil Device Password System," filed Jan. 5, 2009, U.S. Appl. No. 12/348,377.

Office Action dated Jan. 13, 2011, U.S. Appl. No. 12/348,377.

Dimartino, Allison A., et al., Patent Application entitled, "System and Method for Active Jamming of Confidential Information Transmitted at a Point-of-Sale Reader," filed Jan. 30, 2008, U.S. Appl. No. 12/022,903.

Katzer, Robin D., et al., Patent Application entitled, "Control of Secure Elements through Point-of-Sale Device," filed Apr. 8, 2008, U.S. Appl. No. 12/099,771.

Zhu, Kevin, Patent Application entitled, "Partially Delegated Over-the-Air Provisioning of a Secure Element," filed Jan. 5, 2009, U.S. Appl. No. 12/348,371.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action dated Mar. 11, 2011, U.S. Appl. No. 12/022,903.

Office Action dated Mar. 1, 2011, U.S. Appl. No. 121099,771.

Office Action—Restriction dated Mar. 16, 2011, U.S. Appl. No. 12/348,371.

Office Action—Restriction dated Mar. 14, 2011, U.S. Appl. No. 12/371,901.

Office Action dated Apr. 14, 2011, U.S. Appl. No. 12/371,901.

Office Action dated May 24, 2011, U.S. Appl. No. 12/348,371.

DiMartino, Allison, "Method for Launching an Electronic Wallet," filed Jan. 4, 2012, U.S. Appl. No. 13/343,708.

Notice of Allowance dated Dec. 14, 2011, U.S. Appl. No. 12/702,270, filed Feb. 8, 2010.

Final Office Action dated Jan. 4, 2012, U.S. Appl. No. 12/099,771.

Notice of Allowance dated Jan. 5, 2012, U.S. Appl. No. 12/348,377.

FAIPP Pre-Interview Communication dated Feb. 21, 2012, U.S. Appl. No. 13/270,205.

Advisory Action dated Feb. 9, 2012, U.S. Appl. No. 12/371,901.

DiMartino, Allison A., et al., Patent Application entitled, "System and Method for Active Jamming of Confidential Information Transmitted at a Point-of-Sale Reader," filed Aug. 11, 2011, U.S. Appl. No. 13/207,645.

Final Office Action dated Aug. 5, 2011, U.S. Appl. No. 11/949,759, filed Dec. 3, 2007.

Notice of Allowance dated Jun. 21, 2011, U.S. Appl. No. 12/022,903.

Office Action dated Aug. 3, 2011, U.S. Appl. No. 12/099,771.

Final Office Action dated Jun. 20, 2011, U.S. Appl. No. 12/348,377.

Supplemental Notice of Allowance dated Sep. 13, 2011, U.S. Appl. No. 12/022,903.

Advisory Action dated Aug. 30, 2011, U.S. Appl. No. 12/348,377.

Notice of Allowance dated Sep. 9, 2011, U.S. Appl. No. 12/348,371.

Anonymous, "Sourcebook '96," Progressive Grocer Sourcebook '96 Supplement, Dec. 1995, pp. Cover-48, Maclean-Hunter Media Inc.

DiMartino, Allison, Patent Application "Method and System for Setting Levels of Electronic Wallet Security," filed Feb. 8, 2010, U.S. Appl. No. 12/702,270.

Zhu, Kevin, Patent Application entitled, "Partially Delegated Over-the-Air Provisioning of a Secure Element," filed Oct. 10, 2011, U.S. Appl. No. 13/270,205.

Notice of Allowance dated Oct. 17, 2011, U.S. Appl. No. 11/949,759, filed Dec. 3, 2007.

Pre-Interview Communication dated Nov. 15, 2011, U.S. Appl. No. 13/207,645, filed Aug. 11, 2011.

Pre-Interview Communication dated Nov. 9, 2011, U.S. Appl. No. 12/702,270, filed Feb. 8, 2010.

Supplemental Notice of Allowance dated Sep. 28, 2011, U.S. Appl. No. 12/022,903.

Supplemental Notice of Allowance dated Oct. 6, 2011, U.S. Appl. No. 12/348,371.

Final Office Action dated Oct. 14, 2011, U.S. Appl. No. 12/371,901.

Dimartino, Allison, "Method for Launching an Electronic Wallet," filed Dec. 3, 2007, U.S. Appl. No. 11/949,759.

Dimartino, Allison, "Method and System for Setting Levels of Electronic Wallet Security," filed Sep. 28, 2007, U.S. Appl. No. 11/863,632.

Notice of Allowance dated Apr. 2, 2012, U.S. Appl. No. 13/207,645, filed Aug. 11, 2011.

Notice of Allowance dated Apr. 9, 2012, U.S. Appl. No. 13/270,205.

Baker, D., "Real-Time Provisioning of SIM cards: A Boon to GSM Operators", Apr. 13, 2011. http://www.billingworld.com/blogs/baker/2011/04/real-time-provisioning-of-sim-cards-a-boon-to-gsm.aspx.

* cited by examiner

METHOD AND SYSTEM FOR BLOCKING CONFIDENTIAL INFORMATION AT A POINT-OF-SALE READER FROM EAVESDROPPING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A point-of-sale (POS) terminal or station may receive payment information associated with a purchase and seek authorization for payment from a back-end financial system, for example a credit card authorization service. The point-of-sale terminal may receive the financial information from a contactless card. A contactless card communicates with a point-of-sale terminal or other device at least in part without physically contacting the point-of-sale terminal, for example through radio frequency communication conducted in the proximity of the point-of-sale terminal. This radio frequency communication may include near field communication (NFC) technology.

Various payment cards, retail loyalty cards, and product coupons may be employed in different payment and/or purchase scenarios. For example, in paying for groceries at a point-of-sale (POS) terminal a customer may present a loyalty card issued by the grocery store chain, one or more product coupons, and either a credit card or a debit card. In another payment scenario, a commuter may present a transit card to obtain access to a mass transit vehicle.

SUMMARY

In an embodiment, a method for point-of-sale transactions is disclosed. The method comprises a point-of-sale terminal receiving confidential information from a portable electronic device over a contactless communication link, the confidential information being used by the point-of-sale terminal to complete the transaction. The method also includes substantially blocking access to the contactless communication link beyond the area adjacent to the point-of-sale terminal to reduce eavesdropping on the confidential information.

In another embodiment, a point-of-sale terminal is disclosed. The point-of-sale terminal comprises a contactless communication transceiver configured to receive an emission containing confidential information from a portable electronic device. The point-of-sale terminal also comprises an enclosure having an aperture to promote at least partial insertion of the portable electronic device, wherein the enclosure is constructed to promote substantially confining the emission within the enclosure, to reduce eavesdropping on the confidential information, while promoting the transceiver receiving the emission.

In an additional embodiment, another point-of-sale terminal is disclosed. The point-of-sale terminal comprises a near field communication (NFC) transceiver configured to receive a radio frequency (RF) signal containing financial information from a portable electronic device to complete a payment transaction. The point-of-sale terminal also comprises a least one RF absorber panel positioned to substantially reduce propagation of the RF signal containing financial information beyond the RF absorber panel to reduce eavesdropping on the RF signal containing the financial information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Payment for products or services using contactless communication, for example a smart card or a mobile phone containing an electronic wallet application communicating with a point-of-sale terminal using near field communications (NFC) technology, may be vulnerable to eavesdropping and identity theft. An identity thief may electronically eavesdrop on an NFC payment transaction, capture financial information including a credit card account number and a personal identification number (PIN), which may include encrypted and/or hashed versions of these numbers, and later use this financial information to charge payments for goods and services. The present disclosure describes several embodiments of methods and systems for reducing the risk of eavesdropping on contactless communication. In one embodiment an enclosure is provided at the point-of-sate terminal which substantially blocks the propagation of the contactless communication beyond the enclosure. The shopper, for example, may insert a transmitting end of a portable electronic device containing an electronic wallet application into an aperture of the enclosure. The exchange of contactless communication signals between the portable electronic device and a contactless communication transceiver of the point-of-sale terminal, consequently, takes place within the enclosure and reduces the opportunity for eavesdropping. Alternatively, the shopper while holding the device may insert the entire portable electronic device into an aperture of the enclosure. In another embodiment, absorber panels are positioned effectively around the point-of-sale terminal to substantially block propagation of the contactless communication signal beyond the immediate vicinity of the point-of-sale terminal, thereby reducing the chances for eavesdropping unobserved at a discrete distance.

Figure 1:
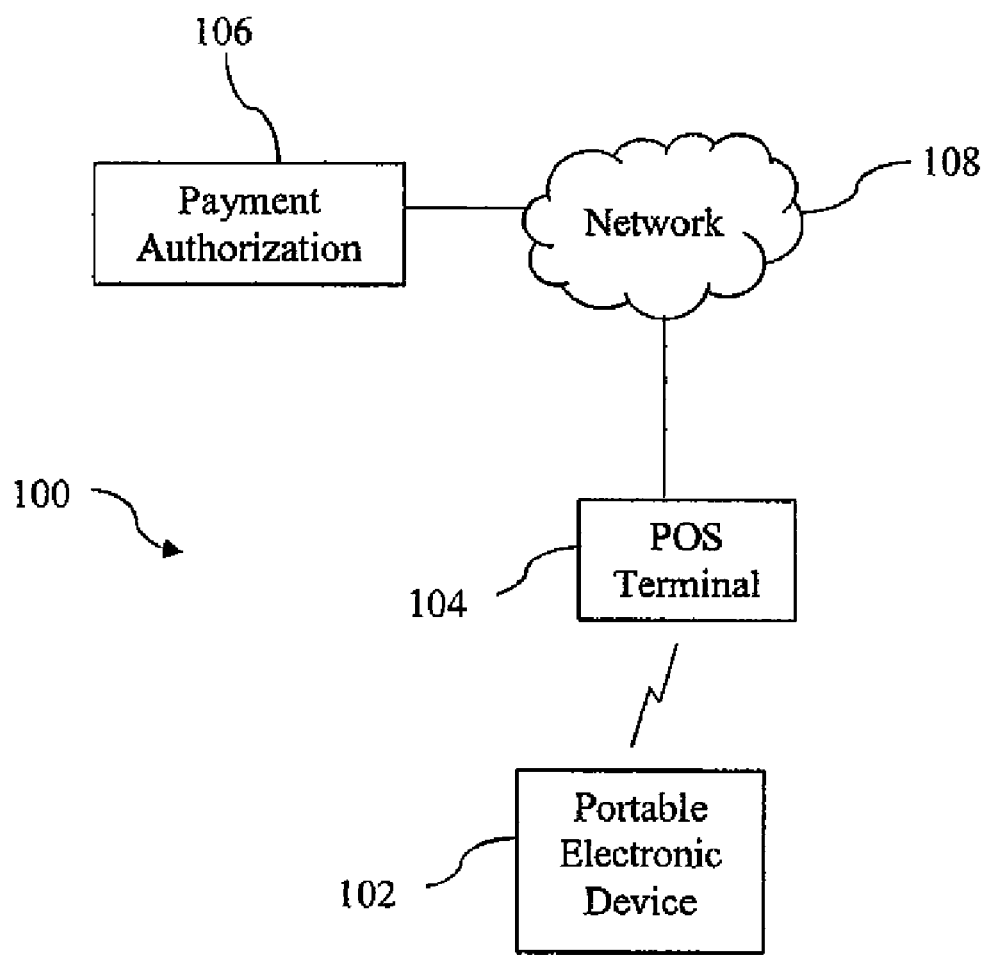
FIG. 1 is an illustration of a point-of-sale terminal according to an embodiment of the disclosure.

Turning now to FIG. 1, a system 100 for completing payment transactions according to an embodiment of the disclosure is discussed. The system 100 comprises a portable electronic device 102, a point-of-sale (POS) terminal 104, a payment authorization center 106, and a network 108. A payment for a product or service may be made electronically by the portable electronic device 102 through contactless communication with the POS terminal 104, for example by communicating payment information such as a credit card or a transit card account number. For purposes of the present disclosure, contactless communication is intended to include a wide variety of communication means including near field communication (NFC) technology, infra-red, ultra-sonic, optical, radio frequency, wireless, Bluetooth, Wi-Fi, and other communication links that do not involve direct physical contact. In an embodiment, the POS terminal 104 completes the payment transaction by handshaking with the payment authorization center 106, communicating with the payment authorization center 106 through the network 108. In another embodiment, the POS terminal 104 completes the payment transaction without communicating with the payment authorization center 106.

The POS terminal 104 may be embodied as a general purpose computer system, to be discussed in greater detail hereinafter. The POS terminal 104 communicates via contactless communication with the portable electronic device 102 by any of a variety of means including near field communication (NFC) technology, infra-red, ultra-sonic, optical, radio frequency (RF), and other communication links. The POS terminal 104 may be connected to databases or networked to servers (not shown) which provide product and service pricing information, including any discounting associated with a loyalty card and/or product coupons. In an embodiment, the POS terminal 104 may include a device for scanning a product, for example a bar code reader or radio frequency identification (RFID) reader, to identify a product and to add the associated cost to an accumulating purchase total.

The payment authorization center 106 may authenticate and authorize charges to a credit card such as VISA card, AMERICAN EXPRESS card, MASTERCARD card, DIS-COVER card, gasoline company card, or other credit card. The authorization handshake may require transmission of account identification, for example an account number or a credit card number. Additionally, the authorization handshake may require further authentication information such as a personal identification number (PIN), a driver's license number, a security code associated with the credit card, or other authentication information. If the payment authorization center 106 approves the transaction, the payment authorization center 106 charges the appropriate account in the amount of the transaction and sends payment approval. The payment authorization center 106 may be implemented as a general purpose computer system.

The network 108 may be any of a public switched telephone network (PSTN), a public data network (PDN), or a combination thereof.

The portable electronic device 102 may be any of a variety of devices including but not limited to a mobile phone, a personal digital assistant (PDA), and a smart card. An exemplary embodiment of a handset suitable to implementing several embodiments of this disclosure, for example a mobile phone and a PDA, is discussed in detail hereinafter. A smart card may promote paying for goods and services in much the same way as a credit, card, a debit card, and a transit card are used, by providing the appropriate financial information at the POS terminal 104. In an embodiment, for example when the portable electronic device 102 is a mobile phone, the portable electronic device 102 may include an electronic wallet application, also referred to as an eWallet, configured to provide a variety of financial and payment capabilities. The electronic wallet application may promote paying for products or services with the portable electronic device 102 in much the same way as presenting a credit card, a debit card, or a transit card for payment, by providing the appropriate financial information to the POS terminal 104. Additionally, the electronic wallet application may promote paying from a payment account.

The financial information, which may also be referred to as confidential information, when it is transmitted from the portable electronic device 102 to the POS terminal 104 may be exposed to theft by others who could use the financial information to make unauthorized or fraudulently authorized payments for goods and services. For example, the NFC signals, the RF signals, the infrared signals, or other communication link signals may propagate or spread out beyond the POS terminal 104 and be received by an identify thief. The contactless communication signals may reflect off surfaces and/or objects and spread out around the POS terminal 104 and be received by an identify thief.

In an embodiment, the POS terminal 104 may begin or initialize a payment transaction by sending an initiation message to the portable electronic device 102 via contactless communication, for example NFC technology. The POS terminal 104 may receive confidential information from the portable electronic device 102, for example a credit card number and a PIN or encrypted or hashed versions of these numbers. To avoid the theft of the confidential information, the system 100 may block access to the radiated signal, for example a radiated NFC signal, by substantially blocking the propagation of the radiated signal beyond the area adjacent to the POS terminal 104. In an embodiment, the majority of the energy of the NFC signal containing confidential information may be confined within, for example, a radius of 2 feet of an NFC transceiver (not shown). In another embodiment, the majority of the energy of the NFC signal containing the confidential information may be confined within a larger radius, for example a radius of 20 feet. In this later case, it may be possible to readily detect an identity thief actively capturing the confidential information at a distance of 20 feet. In an embodiment, sufficient attenuation of the contactless communication signal and/or sufficiently limiting the direction of the contactless communication signal may provide important assistance in discouraging identify theft of the confidential information.

Figure 2:
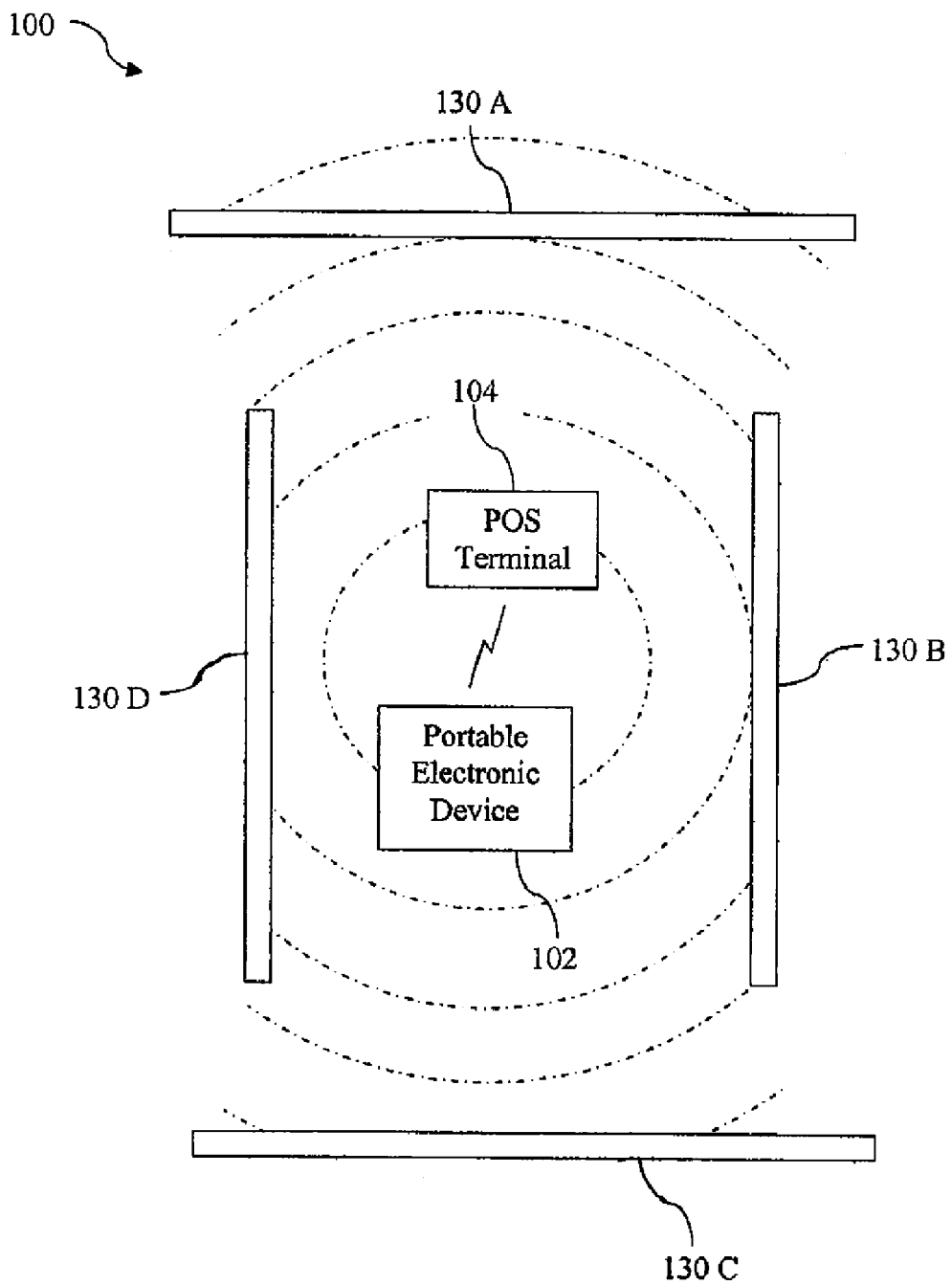
FIG. 2 is an illustration of a point-of-sale terminal comprising radiation absorber panels for blocking confidential information from eavesdropping according to an embodiment of the disclosure.

Turning now to FIG. 2, another embodiment of the system 100 is described. In FIG. 2 the view of the system 100 is from above. To reduce the chances of identify theft and the capturing of the confidential information, one or more absorber pads 130 are placed to effectively attenuate and/or block the radiation or emission of the contactless communication signals transmitted by the portable electronic device 102.

In an embodiment, the absorber pads 130 may be installed with known gaps positioned where a prospective eavesdropper would be exposed to plain sight. Because an identity thief would be unlikely to attempt to eavesdrop from that direction and risk ready detection, there may be no need to invest in the cost of installing absorber pads 130 in those directions.

In different embodiments, different numbers of absorber pads 130 may be used, and the absorber pads 130 may be located or positioned variously depending upon the specific installation configuration of the POS terminal 104 and the surrounding environment. In FIG. 2 an exemplary installation of four absorber pads 130 is depicted, a first absorber pad 130 A, a second absorber pad 130 B, a third absorber pad 130 C, and a fourth absorber pad 130 D. In another embodiment, an absorber pad 130 may be installed overhead, above the POS terminal 104, to attenuate reflection of contactless communication radiation off interior roof, metal support struts, air conditioning ducts, and other surfaces. In another embodiment, an absorber pad 130 may be installed underfoot, below the POS terminal 104, for example in a mat or below a check-out station area.

The absorber pads 130 may be covered with radiation absorbent material (RAM) that prevents or materially attenuates the reflection of radiation incident upon the absorber pads 130, for example NFC radiation, RF radiation, or other contactless communication radiation. The RAM may comprise special paint designed to attenuate reflection of incident radiation. The RAM may comprise arrays of pyramid shaped pieces, each of which is constructed of radiation energy absorbing or "lossy" material. The RAM may be selected to be effective at a specific frequency that matches the frequency of the contactless communication signal frequency. The pyramid shaped pieces of lossy material may be covered with a smooth sheet of material that permits the radiation to pass through, for example to provide a more aesthetically appealing appearance.

Figure 3:
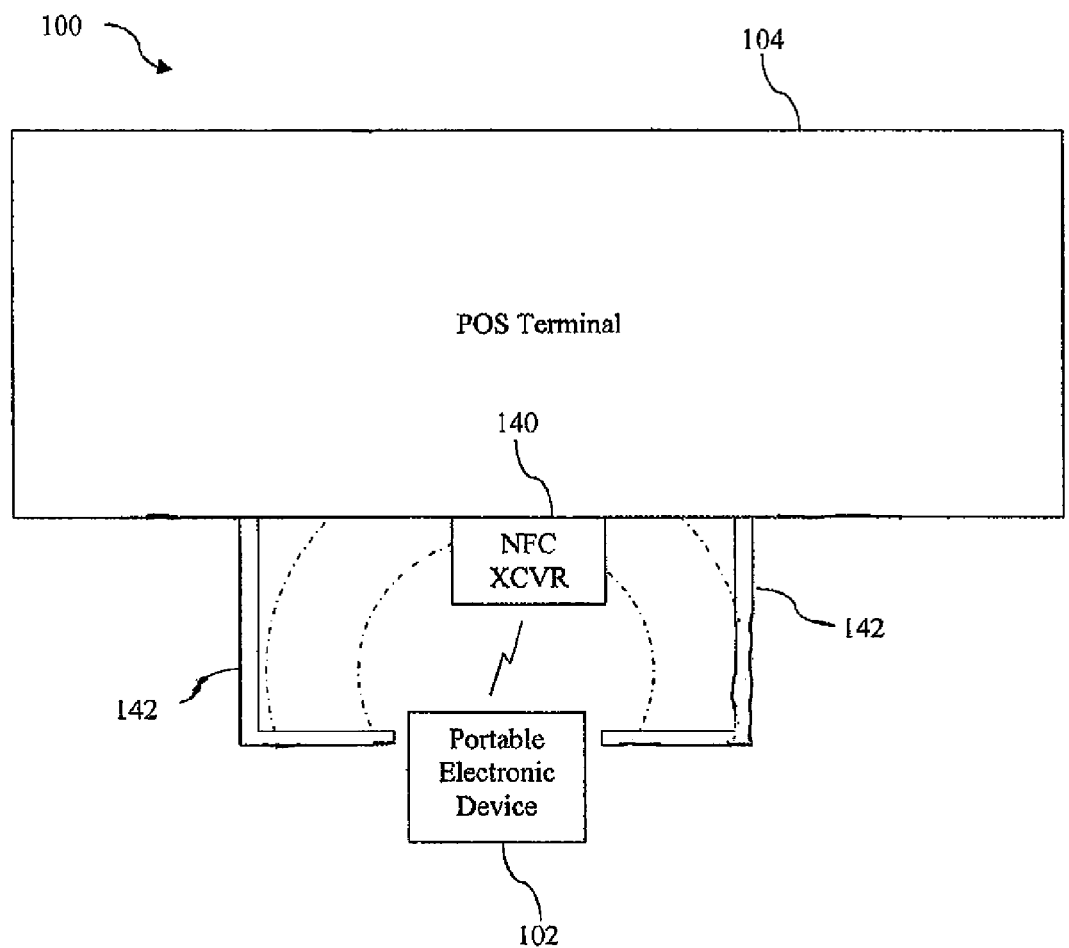
FIG. 3 is an illustration of a point-of-sale terminal comprising an enclosure for blocking confidential information from eavesdropping according to an embodiment of the disclosure.

Turning now to FIG. 3 another embodiment of the system 100 is described. In FIG. 3 the view of the system 100 is from above. A NFC transceiver 140 is shown protruding from the surface of the POS terminal 104 to facilitate understanding of this embodiment. In another embodiment, the NFC transceiver 140 may be enclosed or flush with the surface of the POS terminal 104. An enclosure 142 is joined to the POS terminal 104, wherein the enclosure has an aperture or opening. Shown in FIG. 3 are vertical sides of the enclosure 142. In an embodiment, the enclosure 142 also may have a top side (not shown) and a bottom side (not shown) to fully enclose the NFC transceiver 140, excepting the aperture opening. In another embodiment, however, the enclosure 142 may be left open at the top and at the bottom, based on the theory that radiation of the NFC signal upwards and downwards from the enclosure 142 is not readily susceptible of capture by identity thieves. In another embodiment the enclosure 142 may be positioned flush with the POS terminal 104 or adjacent to the POS terminal 104. In a further embodiment, the NFC transceiver 140 may be joined with the enclosure 142, and the NFC transceiver 140 may be separated from the POS terminal 104 and communicating thereto via wired or wireless means. To complete a payment transaction with the POS terminal 104, the portable electronic device 102 may be inserted partially into the aperture of the enclosure 142.

In this position, the NFC signals exchanged between the NFC transceiver 140 and the portable electronic device 102 may be substantially contained within the interior of the enclosure 142, thereby reducing the risk that the confidential information carried by the NFC signals can be captured by an identity thief. In an embodiment the interior of the enclosure 142 may be covered at least partially by RAM as described above. Alternatively, the interior of the enclosure 142 may be lined with metal sheets, metal coated fabric, fabric woven to contain interconnecting metal threads, whereby the radiation of the NFC signals beyond the enclosure 142 may be attenuated. Alternatively, the enclosure 142 may be constructed, at least partially, of a metal material, metal coated fabric, fabric woven to contain interconnecting metal threads, or a metal mesh or chain mail, whereby the radiation of the NFC signals beyond the enclosure 142 may be attenuated. To be effective, the several RF shielding structures described above may be coupled to an electrical ground. In an embodiment, the portable electronic device 102 is substantially enclosed by RF shielding or RAM at least on the portion of the portable electronic device 102 that remains outside of the enclosure 142, such that RF emission from the body of the portable electronic device 102 is substantially attenuated. In an embodiment, this shielding or RAM may be integral with the packaging, shell, or case of the portable electronic device 102.

Additionally, in an embodiment, the metal material, metal coated fabric, interconnecting threads, and metal mesh or chain mail portions of the enclosure 142 may have small holes or openings, where the small holes have diameters no larger than on the order of about $\frac{1}{10}$ the wavelength of the NFC signals employed. Small holes or openings in the enclosure 142 may promote visibility into the enclosure. In an embodiment, linearly polarized NFC signals may be employed, in which case the openings may be no larger than on the order or about $\frac{1}{10}$ the wavelength of the NFC signals employed in the appropriate direction of polarization, while openings may be larger in directions of non-aligned polarization. These and other RF shielding structures are contemplated by the present disclosure.

In one embodiment, NFC signals having a center frequency of about 1.3 GHz may be employed, in which case the openings may be about 1 inch or smaller. In another embodiment, NFC signals having a center frequency of about 2.4 GHz may be employed, in which case the openings may be about $\frac{1}{2}$ inch or smaller. In another embodiment, NFC signals having a center frequency of about 5.8 GHz may be employed, in which case the openings may be about $\frac{1}{5}$ inch or smaller. It will be appreciated by one skilled in the art and/or knowledgeable about electromagnetics that holes somewhat larger than those defined above may still be effective to attenuate radiation of the confidential NFC signals beyond the enclosure 142, that there is not a step-function transition between effective attenuation and ineffective attenuation as the hole size increases, and therefore larger holes are also contemplated by this disclosure.

Figure 4:
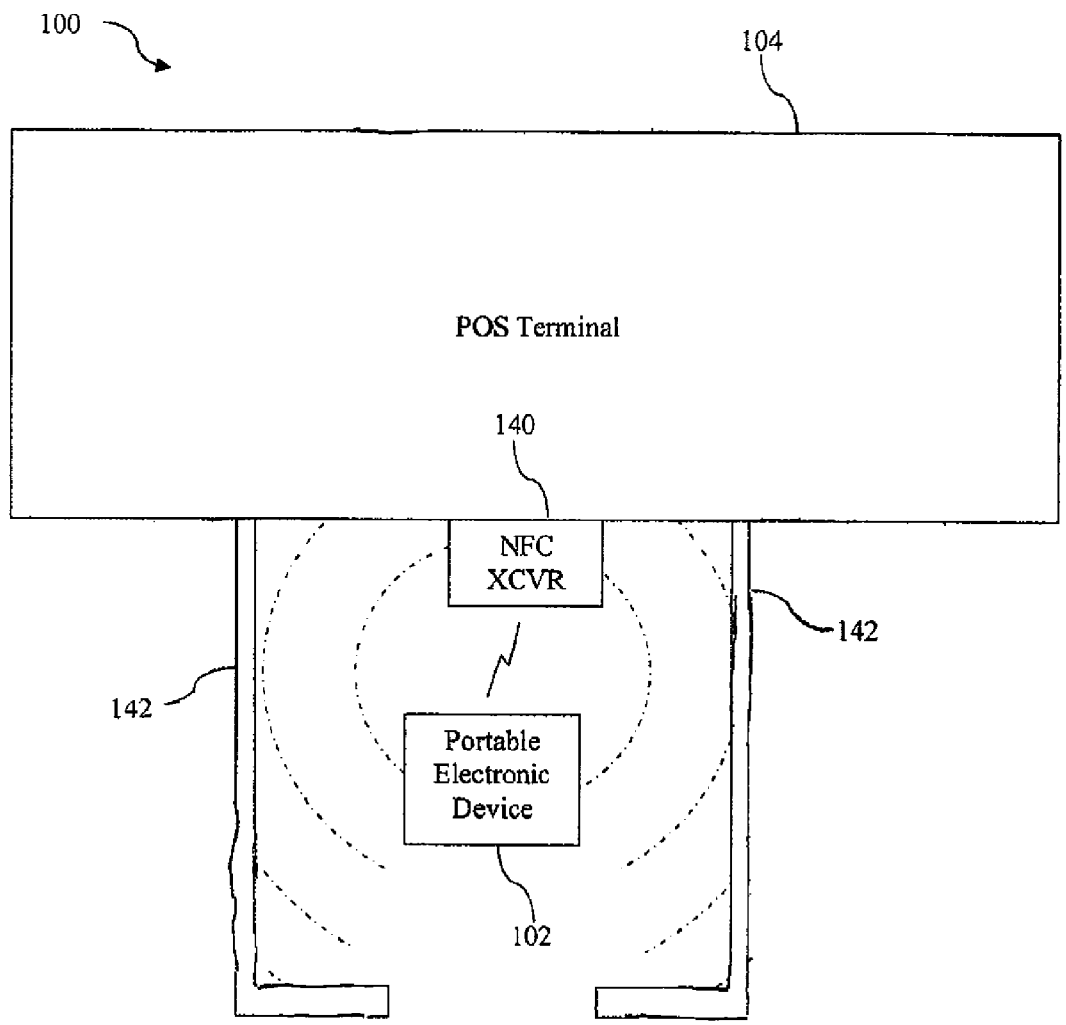
FIG. 4 is an illustration of a point-of-sale terminal comprising an enclosure for blocking confidential information from eavesdropping according to another embodiment of the disclosure.

Turning now to FIG. 4 another embodiment of the system 100 is described. In FIG. 4 the view of the system 100 is from above. The embodiment of FIG. 4 is substantially similar to that described in FIG. 3. In FIG. 4, however, the aperture in the enclosure 142 is configured to allow the portable electronic device 102 to be wholly inserted inside the enclosure 142 while remaining in the hand of the user of the portable device 102, for example a customer. In the embodiment depicted in FIG. 4, the enclosure 142 may be at least partially transparent, whereby to the promote the comfort and personal ease of users putting their hands inside of the enclosure 142. To reduce radiation of NFC signals out of the aperture of the enclosure 142 around the arm and hand of the user, a malleable shielding material (not shown) may be provided to enshroud the arm of the user and attenuate radiation of NFC signals out of the aperture of the enclosure 142. In an embodiment, the malleable shielding may be a metal coated fabric, for example silver metal coating a nylon or other base fabric. In another embodiment, the malleable shielding may be a substantially continuous thin sheet of metal or overlaid multiple sheets of metal enclosed or contained between two layers of fabric or fabric mesh. The malleable shielding may be a fabric with interconnected metal threads woven into the fabric. The malleable shielding may be a metal mesh or chain mail arrangement. The malleable shielding may be coupled to an electrical ground. These and other malleable RF shielding structures are contemplated by the present disclosure.

Figure 5:
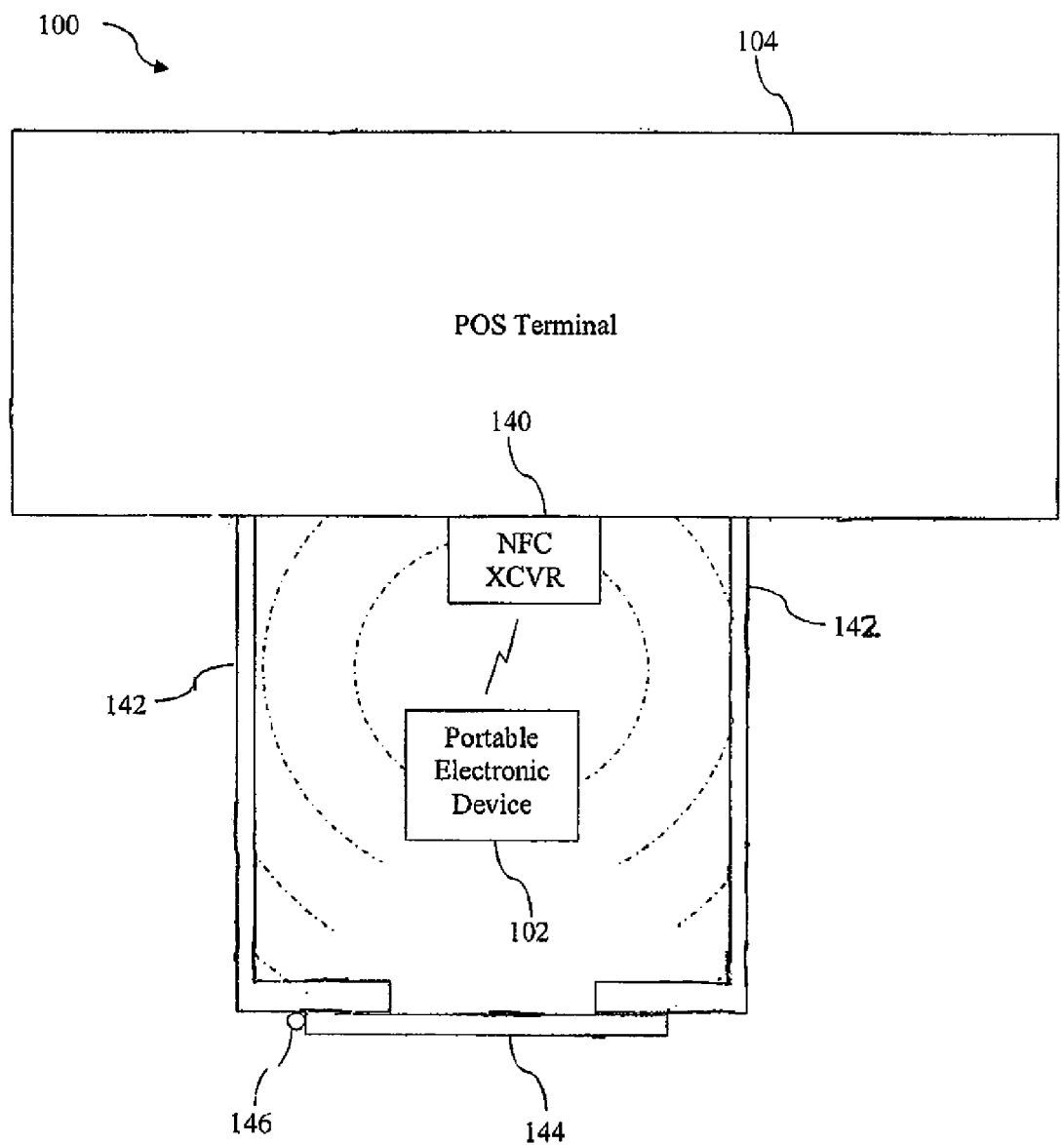
FIG. 5 is an illustration of a point-of-sale terminal comprising an enclosure for blocking confidential information from eavesdropping according to a further embodiment of the disclosure.

Turning now to FIG. 5, another embodiment of the system 100 is described. In FIG. 5 the view of the system 100 is from above. The embodiment of FIG. 5 is substantially similar to that described in FIG. 4. In FIG. 5, however, an enclosure door 144 may be attached via hinge, or other mechanisms, to the enclosure 142, such as by one or more hinges 146. In an embodiment, the inside surface of the enclosure door 144 may be at least partially covered with RAM to attenuate incident radiation. In the embodiment depicted in FIG. 5, the user of the portable electronic device 102 places the portable electronic device 102 inside the enclosure 142, for example placing the portable electronic device 102 on a stand or surface positioned inside the enclosure 142. The user closes the enclosure door 144. The NFC communication exchange between the NFC transceiver 140 and the portable electronic device 102 is completed.

In an embodiment, the user may activate a function of the portable electronic device 102 to enable the transmission of confidential information to the NFC transceiver 140. In an embodiment, the portable electronic device 102 may respond to the user activation by starting a timer, for example a 10 second timer or other effective length of time, and transmitting the confidential information to the NFC transceiver 140 after the timer expires, thereby allowing time for the user to place the portable electronic device 102 inside the enclosure 142 and to close the enclosure door 144 before transmitting the confidential information to the NFC transceiver 140. In another embodiment, the portable electronic device 102 may respond to the user activation by entering a communication mode in which it will transmit the confidential information to the NFC transceiver 140 when the NFC transceiver 140 initiates a handshaking procedure. The operator of the POS terminal 104 may observe when the user has closed the enclosure door 144 and enter a control input to the POS terminal 104 that prompts the NEC transceiver 140 to initiate the handshaking procedure to cause the portable electronic device 102 to transmit the confidential information. Yet other methods of delaying the transmission of confidential information from the portable electronic device 102 to the NFC transceiver 140 until after the enclosure door 144 has been closed are contemplated by the present disclosure.

When the payment transaction is completed, the user opens the enclosure door 144 and retrieves the portable electronic device 102. An indicator light may be placed on the outside of the enclosure 142 to indicate to the customer when the payment transaction has completed, as an indication that they may then open the door 144 and retrieve their portable electronic device 102.

In another embodiment, the inside surface of the enclosure 142 and of the enclosure door 144 are covered with a metal sheet or a metal mesh, wherein the metal on the inside surface of the enclosure 142 and the metal on the inside surface of the enclosure door 144 are in electrical contact, at least while the enclosure door 144 is in the closed position. In this embodiment, the enclosure 142 and the enclosure door 144 form a Faraday cage that attenuates the radiation of the confidential information contained in the NFC signal beyond the confines of the enclosure 142.

Figure 6:
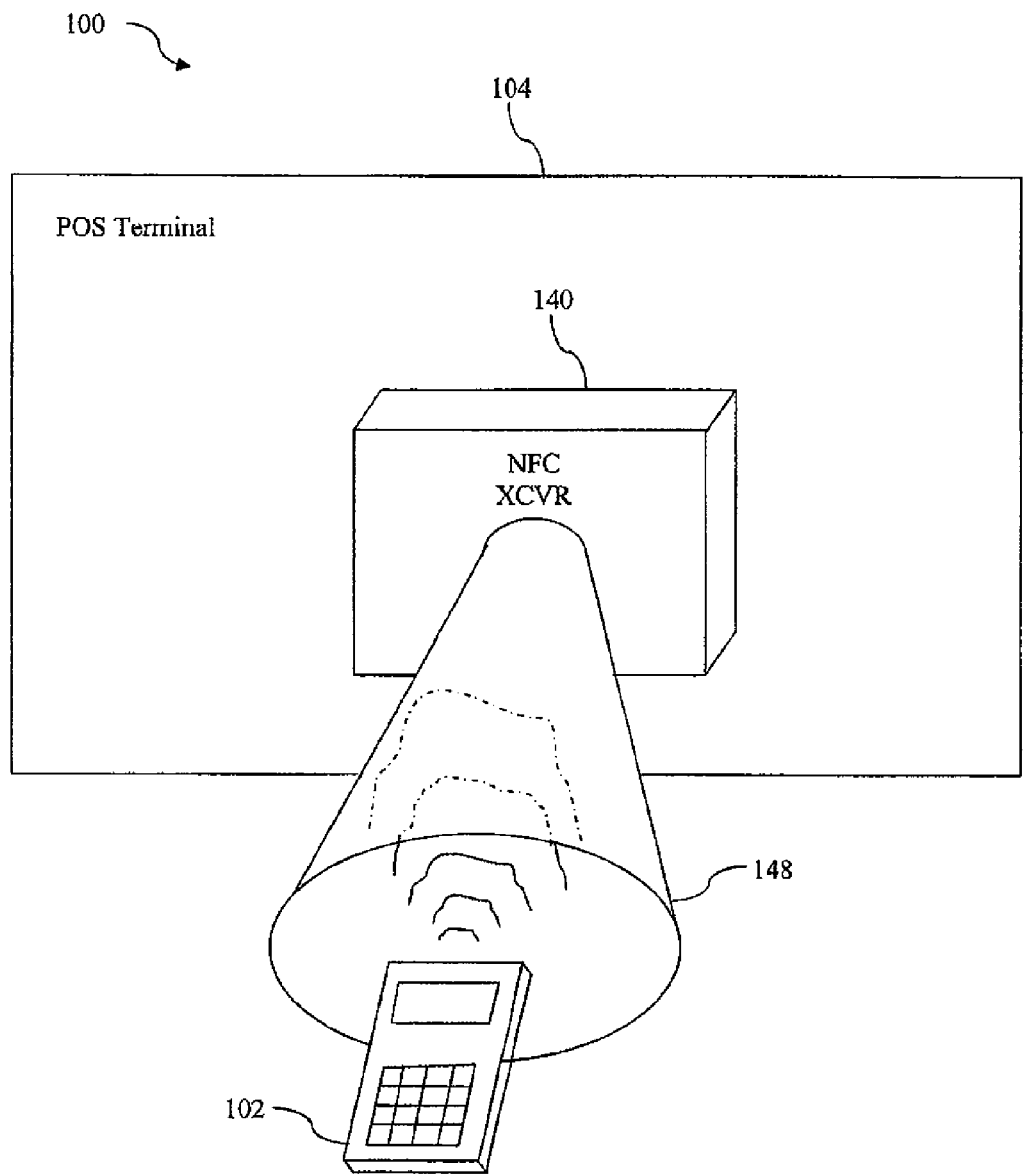
FIG. 6 is an illustration of a point-of-sale terminal comprising a shield for blocking confidential information from eavesdropping according to an embodiment of the disclosure.

Turning now to FIG. 6, another embodiment of the system 100 is described. The NFC transceiver 140 is shown protruding from the surface of the POS terminal 104 to facilitate understanding of this embodiment. In another embodiment, the NFC transceiver 140 may be enclosed or flush with the surface of the POS terminal 104. A shield 148 is joined to the NFC transceiver 140, wherein the shield is open at one end. To complete a payment transaction with the POS terminal 104, the portable electronic device 102 may be inserted partially into the opening of the shield 148. In this position, the NFC signals exchanged between the NFC transceiver 140 and the portable electronic device 102 may be substantially contained within the interior of the shield, thereby reducing the risk that the confidential information carried by the NFC signals can be captured by an identity thief. In an embodiment the interior of the shield 148 may be covered at least partially by RAM. While in FIG. 6 the shield 148 is shown to be substantially conical in shape, it will be readily appreciated that other similar geometric shapes including truncated regular pyramids, cylinders, prisms, and such other shapes are also contemplated as suitable shapes for implementing different embodiments of the system 100.

Figure 7:
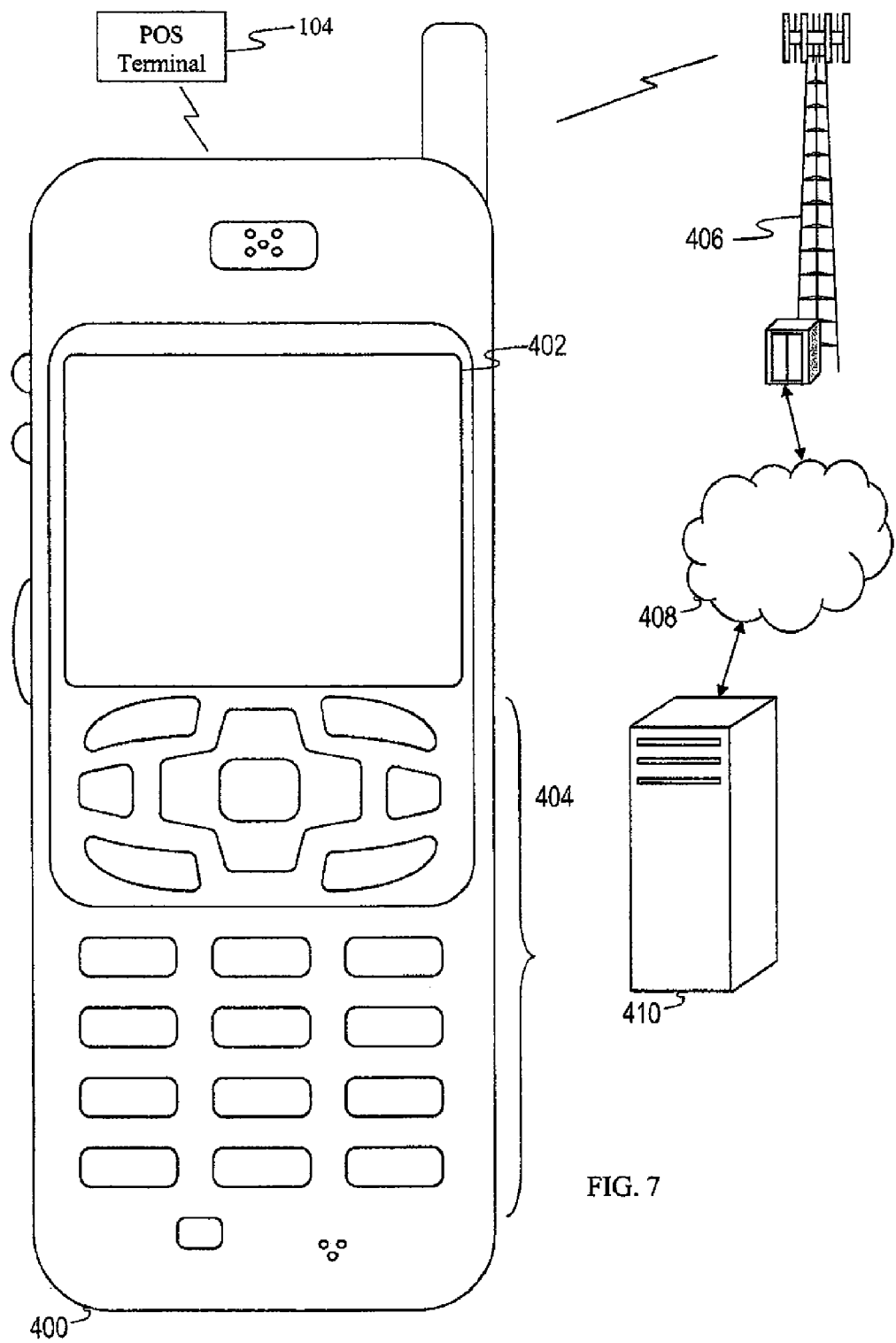
FIG. 7 is an illustration of a handset according to at least one embodiment of the disclosure.

FIG. 7 shows a wireless communications system including a handset 400. FIG. 7 depicts the handset 400, which is operable for implementing aspects of the present disclosure, for example the portable electronic device 102, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA. The handset 400 may support specialized work assignments such as inventory control, job control, and/or task management functions.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset. The handset 400 may further execute one or more software or firmware applications in response to user commands. These applications may configure the handset 400 to perform various customized functions in response to user interaction. Additionally, the handset 400 may be programmed and/or configured over-the-air, for example from a wireless base station, a wireless access point, or a peer handset 400. The handset 400 may have RAM on several interior sides, for example on several interior surfaces, not including on an antenna end, of a cover or package of the handset 400.

The handset 400 may execute a web browser application which enables the display 402 to show a web page. The web page may be obtained via wireless communications with a cell tower 406, a wireless network access node, a peer handset 400 or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402. Alternately, the handset 400 may access the cell tower 406 through a peer handset 400 acting as an intermediary, in a relay type or hop type of connection. The handset 400 may conduct payment transactions using contactless communications means with the POS terminal 104, for example using a contactless communication transceiver (not shown).

Figure 8:
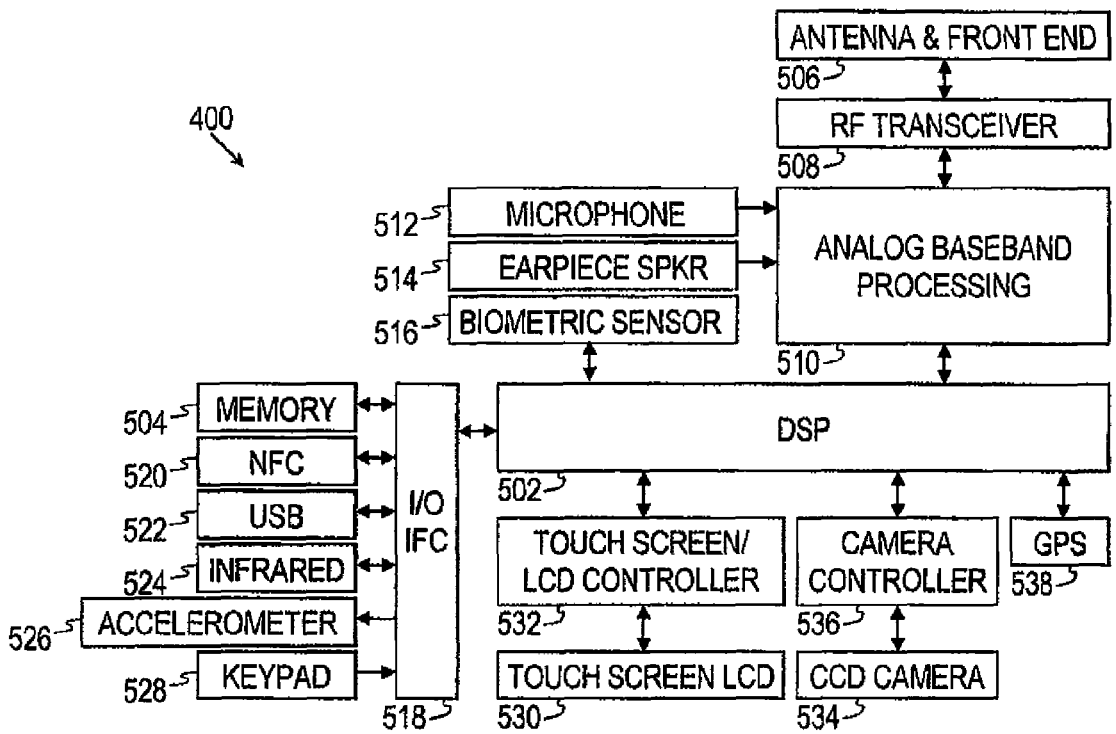
FIG. 8 is a block diagram of a handset according to at least one embodiment of the disclosure.

FIG. 8 shows a block diagram of the handset 400. While a variety of known components of handsets 400 are depicted, in an embodiment a subset of the listed components and/or additional components not listed may be included in the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a biometric sensor 516, an input/output interface 518, a near field communication (NFC) transceiver card or other contactless communication transceiver card 520, a universal serial bus (USB) port 522, an infrared port 524, an accelerometer or other transducer 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the handset 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the handset 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like a removable memory card (not shown) or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network or from a peer handset 400. In an embodiment, the antenna and front end unit 506 may include multiple antennas whereby to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity the description here separates the description of this signal processing from the RF and/or radio stage and conceptually allocates that signal processing to the analog baseband processing unit 510 and/or the DSP 502 or other central processing unit. In some embodiments the RF transceiver 508, portions of the antenna and front end 506, the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and outputs to the earpiece speaker 514. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast fourier transforming, and cyclic prefix appending and for a receiver function the DSP 502 may perform cyclic prefix removal, fast fourier transforming, deinterleaving, decoding, and demodulation. In other wireless technology applications yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card (not shown) may provide software and data to configure the operation of the DSP 502. Among the interfaces may be the NFC transceiver card 520, the USB port 522, and the infrared port 524. The NFC transceiver card 520 may promote communications between the handset 400 and the POS terminal 104. The USB port 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the biometric sensor 516 and to the accelerometer 526. The biometric sensor 516 may detect various biometric characteristics or signatures of a user and provide appropriate biometric input to the DSP 502 or other processor. The accelerometer 526 may serve as a mechanism to sense distinctive movements of the handset 400 and to provide appropriate motion input to the DSP 502 or other processor. In an embodiment, a different transducer may be employed to detect and/or sense distinctive movements of the handset 400.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. In another embodiment, a camera operating according to a technology different from Charge Coupled Device cameras may be employed. Various other peripherals may also be included to provide additional functions, e.g., radio and television reception.

Figure 9:
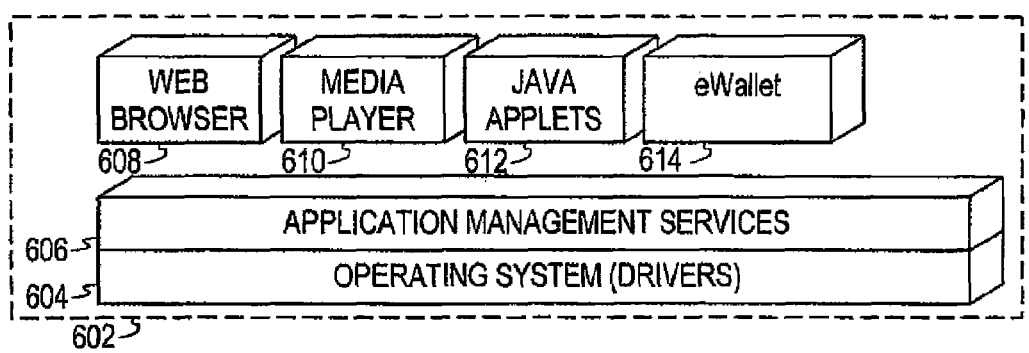
FIG. 9 is a block diagram of a software architecture of a handset according to at least one embodiment of the disclosure.

FIG. 9 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 9 are a web browser application 608, a media player application 610, and JAVA applets 612. The web browser application 608 configures the handset 400 to operate as a web browser, allowing a user to enter information into forms and select links to retrieve and view web pages. The media player application 610 configures the handset 400 to retrieve and play audio or audiovisual media. The JAVA applets 612 configure the handset 400 to provide games, utilities, and other functionality. An eWallet application 614, which may also be referred to as an electronic wallet, is shown in FIG. 9. The software environment 602 may include other applications (not shown) including a VPN application, a spreadsheet application, an address book application, a scheduler application, a contact list application, and/or other applications.

Figure 10:
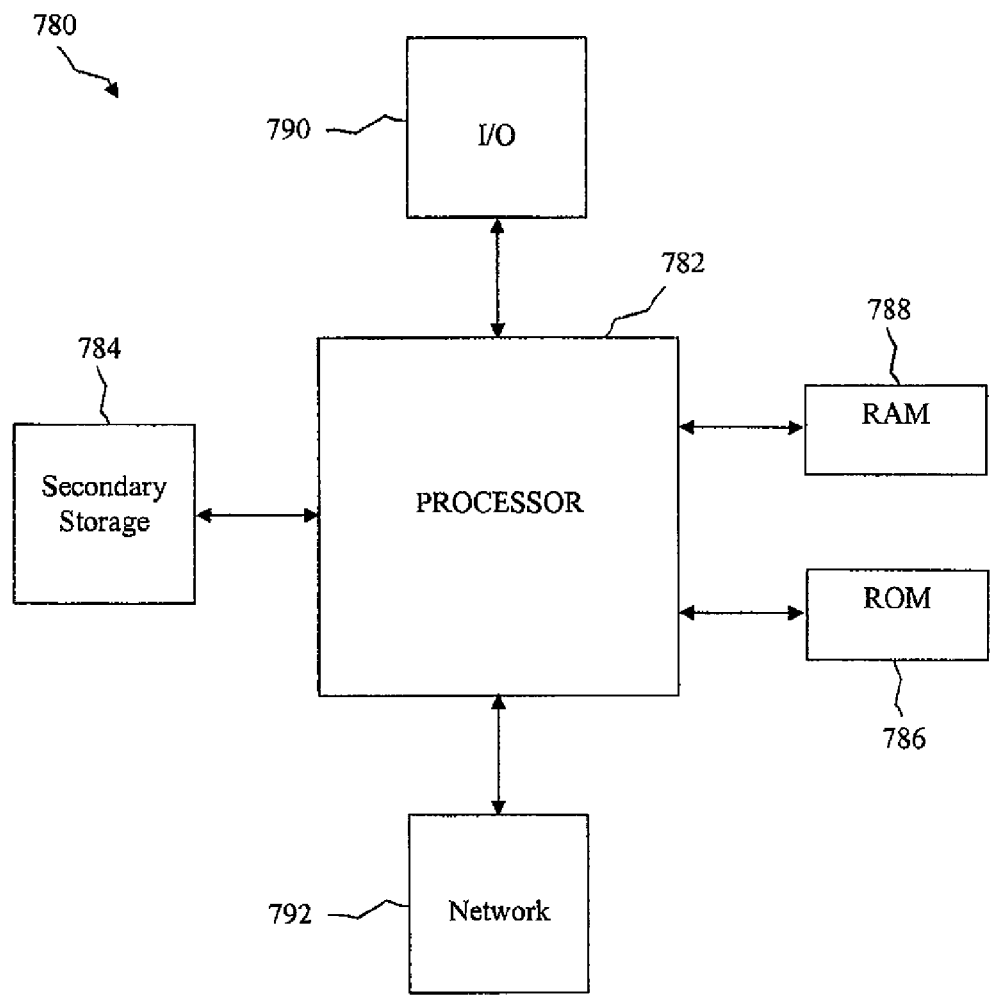
FIG. 10 illustrates an exemplary general purpose computer system suitable for implementing the several embodiments of the disclosure.

Portions of the system 100 described above, for example the POS terminal 104 and the payment authorization center 106, may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor may be implemented as one or more CPU chips.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 792 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for point-of-sale (POS) transactions, comprising:
   receiving a portable electronic device through an aperture of an enclosure of a point-of-sale terminal, wherein the enclosure encloses only a portion of the point-of-sale terminal, and the enclosure substantially surrounds a portion of the portable electronic device;
   receiving, by the point-of-sale terminal, a confidential information from the portable electronic device over a contactless communication link, the confidential information being used by the point-of-sale terminal to complete a transaction; and
   substantially blocking, by way of the enclosure, access to the contactless communication link during the transaction beyond the area adjacent to the point-of-sale terminal, wherein the aperture is constructed such that the portable electronic device is to be at least partially inserted inside the enclosure while being held by a hand of a device user during communication of the confidential information over the contactless communication link.

2. The method of claim 1 wherein the portable electronic device is one of a mobile phone, a smart card, and a personal digital assistant (PDA).

3. The method of claim 1 wherein the portable electronic device is a mobile phone, the mobile phone having an electronic wallet application, the electronic wallet application configured to provide the confidential information associated with charging a purchase price of one of a good and a service to one of a credit card, a debit card, a transit card, and a payment account.

4. The method of claim 1 wherein the substantially blocking access to the contactless communication link during the transaction beyond the area of the point-of-sale terminal is accomplished by substantially enclosing the portable electronic device during the point-of-sale terminal receiving of confidential information.

5. The method of claim 1 further comprising absorbing a radio frequency emitted from the portable electronic device.

6. The method of claim 1 wherein the enclosure is joined to a contactless communication device of the point-of-sale terminal.

7. The method of claim 1 wherein the enclosure surrounds a contactless communication device of the point-of-sale terminal.

8. The method of claim 1 wherein the aperture is configured for insertion of an antenna end of the portable electronic device into the enclosure.

9. The method of claim 1 wherein the body of the portable electronic device is constructed to promote substantially blocking contactless communication from that portion of the portable electronic device that remains outside of the enclosure when the portable electronic device is at least partially inserted into the aperture of the enclosure.

10. The method of claim 1 wherein the enclosure is constructed to attenuate the confidential information transmitted over the contactless communication link.

11. The method of claim 10 wherein the interior of the enclosure is at least partially covered with contactless communication absorbing material.

12. The method of claim 1 further comprising closing a door of the aperture attached to the enclosure.

13. The method of claim 12 wherein closing the door forms a Faraday cage with the enclosure and the door.

14. The method of claim 1, wherein the enclosure protrudes from the point-of-sale terminal.

15. The method of claim 1, wherein the enclosure substantially surrounds the portable electronic device.

16. The method of claim 1, wherein the enclosure encloses a contactless communication receiver of the point-of-sale terminal.

17. The method of claim 1, wherein the enclosure encloses only a portion of a contactless communication receiver of the point-of-sale terminal.

18. A method for point-of-sale transactions, comprising:
   receiving a portable electronic device through an aperture of an enclosure of a point-of-sale terminal, wherein the enclosure does not enclose all of the point-of-sale terminal, and the enclosure substantially surrounds a portion of the portable electronic device;
   receiving, by the point-of-sale terminal, a confidential information from the portable electronic device over a contactless communication link, the confidential information being used by the point-of-sale terminal to complete a transaction; and
   blocking, by way of the enclosure, access to the contactless communication link during the transaction beyond the area adjacent to the point-of-sale terminal, wherein the aperture is constructed such that the portable electronic device is to be at least partially inserted inside the enclosure while being held by a hand of a device user during communication of the confidential information over the contactless communication link.

19. The method of claim 18, wherein the enclosure substantially surrounds the portable electronic device.

20. The method of claim 18, wherein the enclosure protrudes from the point-of-sale terminal.

* * * * *